(12) United States Patent
Hamada et al.

(10) Patent No.: US 6,989,957 B2
(45) Date of Patent: Jan. 24, 2006

(54) DISK STORAGE DEVICE

(75) Inventors: Yosuke Hamada, Fujisawa (JP);
Kazuyuki Date, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 110 days.

(21) Appl. No.: 10/676,570

(22) Filed: Sep. 30, 2003

(65) Prior Publication Data
US 2004/0125492 A1    Jul. 1, 2004

(30) Foreign Application Priority Data
Nov. 26, 2002    (JP)    ............... 2002-342582

(51) Int. Cl.
G11B 5/55    (2006.01)

(52) U.S. Cl. .................................. 360/78.04
(58) Field of Classification Search ............ 360/78.04, 360/75, 77.02, 77.08, 78.06, 78.12
See application file for complete search history.

(56) References Cited

U.S. PATENT DOCUMENTS

| | | | | |
|---|---|---|---|---|
| 6,097,564 A | * | 8/2000 | Hunter | ..................... 360/78.04 |
| 6,204,629 B1 | * | 3/2001 | Rote et al. | ..................... 360/75 |
| 6,373,650 B1 | * | 4/2002 | Pedrazzini | ............... 360/78.04 |
| 6,501,609 B2 | * | 12/2002 | Saito et al. | ............... 360/78.04 |
| 6,542,324 B1 | * | 4/2003 | Galbiati et al. | ................ 360/75 |
| 6,563,660 B1 | * | 5/2003 | Hirano et al. | ............ 360/78.06 |
| 6,757,129 B2 | * | 6/2004 | Kuroiwa et al. | ......... 360/78.04 |
| 6,795,268 B1 | * | 9/2004 | Ryan | ....................... 360/78.04 |

FOREIGN PATENT DOCUMENTS

| | | |
|---|---|---|
| JP | 2000 222837 A | 8/2000 |
| JP | 2001 250345 A | 9/2001 |
| JP | 2002 093080 A | 3/2002 |

* cited by examiner

*Primary Examiner*—David Hudspeth
*Assistant Examiner*—James L Habernehl
(74) *Attorney, Agent, or Firm*—Townsend and Townsend and Crew LLP

(57) ABSTRACT

A disk drive comprises a controller (70) that calculates a drive signal for positioning a head at a desired track on the basis of a desired track-position signal and a measured head-position signal, and a drive circuit for driving a voice-coil motor. The drive circuit includes a current feedback amplifier (21) and a voltage feedback amplifier (50), which can be selectively used. The controller (70) is provided with a speed limiter for determining a maximum speed limiting the speed of a head. The voltage feedback amplifier of the drive circuit is used when the head-position signal is unstable or otherwise malfunctioning, and the current feedback amplifier of the drive circuit is used when the head-position signal is normal.

11 Claims, 4 Drawing Sheets

DISK STORAGE DEVICE

CROSS-REFERENCE TO RELATED APPLICATIONS

This application claims priority from Japanese Application No. 2002-342582, filed Nov. 26, 2002, the entire disclosure of which is incorporated by reference for all purposes.

BACKGROUND OF THE INVENTION

The present invention relates generally to disk storage devices (e.g., magnetic disk drives or optical disk drives) that move a head relative to a storage medium, and more specifically to techniques for improving the head positioning.

In a conventional track access control system included in a magnetic disk drive or an optical disk drive, a voice-coil motor (VCM) is used to move one or more read/write heads to and positioning them at a desired track. A controller forms a positioning feedback loop and gives a control input to a drive circuit. The drive circuit includes a current feedback amplifier that feeds back VCM drive current. A head support mechanism that supports the read/write head is accelerated by the VCM, wherein the acceleration is proportional to the control input for a head-positioning control operation (see e.g., Japanese published application JPA 2000-222837).

In other prior art, a disk access control system uses a current feedback amplifier, and obtains the speed of a read/write head by differentiating a head-position signal. In this way, the speed information is monitored, and the speed is reduced to zero in case of a defect. (see e.g., Japanese published application JPA 2001-250345).

Further, in other prior art, in a load-unload type head control system using a current feedback amplifier, a read/write head is positioned by a low-speed control in loading an unloaded read/write head to the disk, as distinguished from a seek operation (see e.g., Japanese published application JPA 2002-93080).

The drive circuit of the positioning control system disclosed in Japanese published application JPA 2000-222837 includes a current feedback amplifier that feeds back a current supplied to a VCM. A current proportional to a drive signal is supplied to the VCM to control the acceleration of the head support mechanism supporting the read/write head. This known control system has problems that the response to a step input of the desired value overshoots greatly. Thus in the event of a malfunction of a position measuring unit, the head support mechanism supporting the read/write head moves at an extraordinary speed that exceeds the limit of the predetermined range. This can cause the support mechanism to collide with a stopper and damage the disk drive.

The disk access control system disclosed in Japanese published application JPA 2001-250345, stops the seek operation and reduces the speed of the read/write head to zero when the speed information is malfunctioning. Also, the desired speed is obtained from calculating the difference between the signal that represents the desired track and the signal that represents the head position. This art uses a differentiator for converting the head-position signal into a speed signal. This leads to complicated circuitry to implement these functions.

The load-unload type head control system disclosed in Japanese published application JPA 2002-93080 moves the read/write head at a high speed in a high-speed control mode for a seek operation, and a low speed in a low-speed control mode in loading the read/write head. Since the head-position signal is not provided in the low-speed control mode, the counter electromotive voltage of the VCM is measured and used instead of the head-position signal. This art is a low-speed control, different from an art for positioning a read/write head at a desired track.

Accordingly, what is needed is a disk drive that is capable of positioning a head in a reliable manner.

SUMMARY OF THE INVENTION

In brief, the invention provides techniques for improving the reliability with which a disk storage device positions a head. In specific embodiments, the head is a magnetic head that reads information from a magnetic disk and writes information to the disk. However, the invention is not limited to magnetic disks, nor is it limited to heads that read and write information to the disks.

In one aspect of the present invention, a disk storage device comprises an information storing disk, a head for writing data to tracks on the disk and/or reading data from tracks on the disk, a head-moving mechanism that moves the head in response to an input signal, a head-position measuring circuit that generates a head-position signal representing a radial position of the head relative to the disk, a current feedback amplifier, a voltage feedback amplifier, and a controller. The controller is configured to generate a drive signal using a desired track-position signal and the head-position signal generated by the head-position measuring circuit, set an upper limit on the drive signal, and monitor the head-position signal, or a signal derived from the head-position signal, to determine whether a malfunction condition exists.

In the event that a malfunction condition is determined to exist, the drive signal is applied as an input to the voltage feedback amplifier and an output from the voltage feedback amplifier is provided as the input signal to the head-moving mechanism. Conversely, in the event that a malfunction condition is not determined to exist, the drive signal is applied as an input to the current feedback amplifier and an output from the voltage feedback amplifier is provided as the input signal to the head-moving mechanism.

In some embodiments, the monitored signal is the head-position signal, and in other embodiments the monitored signal includes one or more of a positioning error signal, a speed signal or a speed error signal. In some embodiments, the malfunction condition is due to defects in the disk or troubles in the head when the head is moved for seeking and tracking. In some embodiments, the malfunction condition is an instability of the head-position signal or the signal derived from the head-position signal In another aspect of the present invention, a disk storage device including a positioning control system for moving and positioning a head to a desired track is capable of reducing the overshoot of the head. Moreover, a stable positioning of the head without moving the head at an extraordinary speed is achieved by limiting the speed of the head, in response to a positioning disorder signal.

In another aspect of the present invention, a disk storage device comprises an information storing disk, a head for writing data to tracks on the disk and/or reading data from tracks on the disk, a head support mechanism supporting and moving the head, a voice-coil motor for driving the head support mechanism, a head-position measuring circuit for measuring a radial position of the head relative to the disk, a controller that calculates a drive signal on the basis of a desired track-position signal and a measured head-position signal measured by the head-positioning measuring circuit and sends out the drive signal to position the head at a position corresponding to a desired track, and a drive circuit driven by the drive signal for positioning the head at the position corresponding to the desired track by driving the voice-coil motor In accordance with this aspect, the drive circuit includes a current feedback amplifier and a voltage feedback amplifier which can be selectively used, the controller is provided with a speed limiter for limiting the speed of the head to a predetermined maximum speed, and the voltage feedback amplifier of the drive circuit is used when the head-position signal is unstable or indicates a malfunction condition, and the current feedback amplifier of the drive circuit is used when the head-position signal is a normal signal during seeking and tracking operations.

In some embodiments, the controller includes a speed determining unit that provides a speed signal indicating the speed of the head by differentiating the head-position signal provided by the head-positioning measuring circuit, a desired speed determining unit that generates a desired speed signal on the basis of the head-position signal provided by the head-positioning measuring circuit and the desired track-positioning signal, and a subtractor that generates a speed deviation signal by subtracting the output signal of the desired speed determining unit from the output signal of the speed determining unit.

With such a configuration, the speed of the head is limited. Also, the overshoot of the head can be reduced. Moreover, even if the head support mechanism collides against the stopper, the speed can be limited.

A further understanding of the nature and advantages of the present invention may be realized by reference to the remaining portions of the specification and the drawings.

DESCRIPTION OF ILLUSTRATIVE EMBODIMENTS

Disk storage devices according to embodiments of the present invention will be described in with the drawings. Although the invention is described in connection with positioning a magnetic read/write head relative to a magnetic disk, the invention applies to a variety of disk devices (e.g., magnetic disk drives, optical disk drives), and further applies to write-only and read-only implementations.

Figure 1:
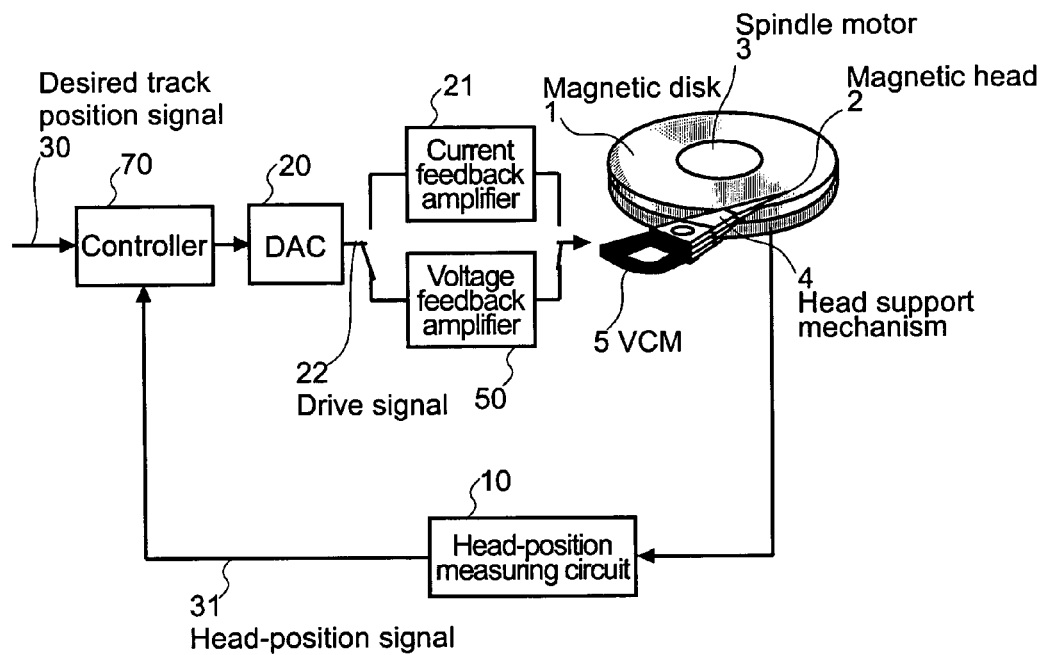
FIG. 1 is a block diagram of an entire head-positioning control system included in a disk storage device in a first embodiment according to the present invention.

FIG. 1 is a block diagram of a head-positioning control system included in a disk storage device in a first embodiment according to the present invention. The disk storage device includes a magnetic disk 1, a magnetic head 2, a spindle motor 3 for rotating the magnetic disk 1, a head support mechanism supporting the magnetic head 2, a voice-coil motor (hereinafter, abbreviated to "VCM") 5 for driving the head support mechanism 4. The magnetic head 2 reads servo information, not shown, previously recorded on a magnetic disk 1 and representing a radial positioning on the magnetic disk 1, and a head-positioning measuring circuit 10 provides a head-position signal 31. A controller 70 subtracts the head-position signal 31 from a desired track positioning signal 30 to obtain a positioning error signal (PES) (shown with reference numeral 32 in FIGS. 2, 5, and 7). This signal, suitably processed is converted by a digital-to-analog converter (DAC) 20 to provide an analog drive signal 22 to a drive circuit for positioning the VCM.

In this embodiment, the drive circuit includes a current feedback amplifier 21 and a voltage feedback amplifier 50 and a mechanism for selecting one or the other to provide the current to the VCM 5 in a manner that the positioning error signal is reduced to zero.

A magnetic pattern corresponding to a positioning signal pattern showing radial position is recorded on the magnetic disk 1. The head 2 is able to read the positioning signal pattern and to provide the head-position signal 31. If the magnetic disk 1 has defects, if the magnetic head 2 is in a malfunction condition, or if dust is held between the magnetic disk 1 and the magnetic head 2, it is possible that the head-position signal 31, such as a track number signal, includes a malfunction signal and a normal head-positioning operation cannot be achieved. It is also possible that the head-position signal is unstable immediately after the connection of the disk drive to a power supply, a malfunction signal is generated and a normal head-positioning operation cannot be achieved. In other words, if the head-positioning operation is controlled by using the current feedback amplifier on the basis of such a malfunction signal, the head is turned at a high acceleration when the current feedback amplifier supplies a current to the VCM. The present invention is intended to achieve a head-positioning control operation by controlling the speed of the head under such a malfunction condition.

Figure 2:
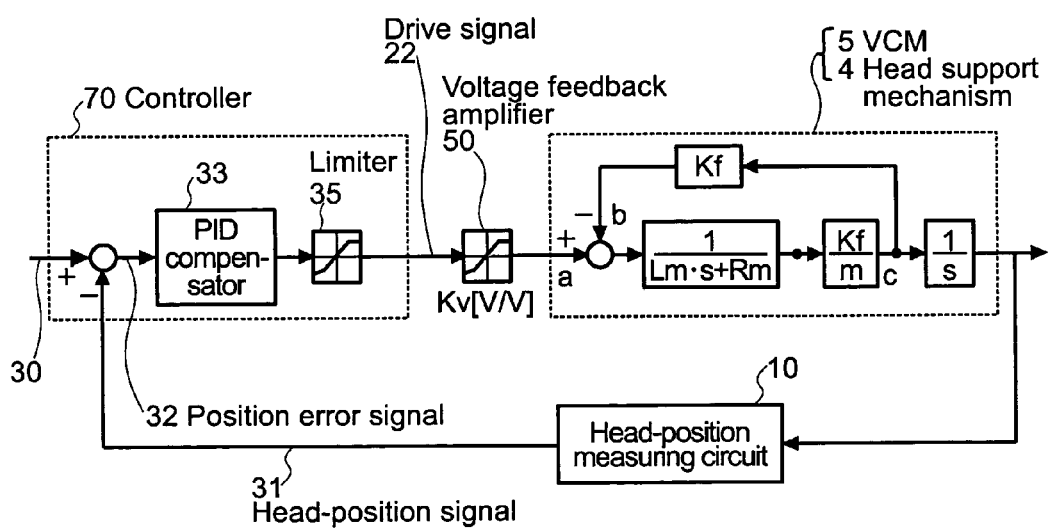
FIG. 2 is a block diagram of the head-positioning control system in a state where a circuit connected to a voltage feedback amplifier is closed.

FIG. 2 is a block diagram showing additional details of the configuration where voltage feedback amplifier 50 is selected and also showing additional details of the VCM 5 and the controller 70. A PID (proportional-integral-derivative) compensator 33 of the controller 70 operates to reduce the positioning error signal 32, i.e., the difference between a desired track-positioning signal 30 and the head-position signal 31, to zero. An output signal provided by the PID compensator 33 is processed by a limiter 35 such that the drive signal 22 is saturated with a value obtained by dividing the product of multiplication of a desired maximum speed $V_{max}$ (m/s) and the counter electromotive voltage constant $K_f$ (V/(m/s) of the voice-coil motor, i.e., a constant dependent on the design of the VCM, by the gain Kv (V/V) of the voltage feedback amplifier.

A speed control loop is formed for the VCM 5 by a counter electromotive voltage feedback loop obtained by multiplying the speed of the head support mechanism by the counter electromotive voltage constant $K_f$ (V/(m/s)). The speed of the head support mechanism is limited to $V_{max}$(m/s) by the VCM input voltage saturated with $K_f \times V_{max}$ (V).

More specifically, the saturation level of the limiter 35 is $K_f \times V_{max}$ /Kv, where Kv is the gain of the voltage feedback amplifier 50 and $K_f$ is the VCM counter electromotive voltage constant of the VCM 5 and the head support mechanism 4. A point "c" indicates the actual speed V of the head. The characteristic saturation of the voltage feedback amplifier is equal to the supply voltage, such as 12 V. A voltage to be limited at a point "a" is $(K_f \times V_{max}/Kv) \times Kv$. Voltage at a point "b" is $K_f \times V$. If the positioning error signal 32 is malfunctioning, the drive signal 22 of a malfunction voltage corresponding to the malfunctioning positioning error signal 32 is not provided, the limiter 35 limits the voltage to $K_f \times V_{max}/Kv$, and the speed of the head (the voltage at the point "c") is controlled through the voltage feedback amplifier 50 within the limited voltage. Thus, the positioning of the head is controlled by the voltage limited by the saturation characteristic of the limiter to reduce the positioning error signal 32 gradually to zero.

Figure 3:
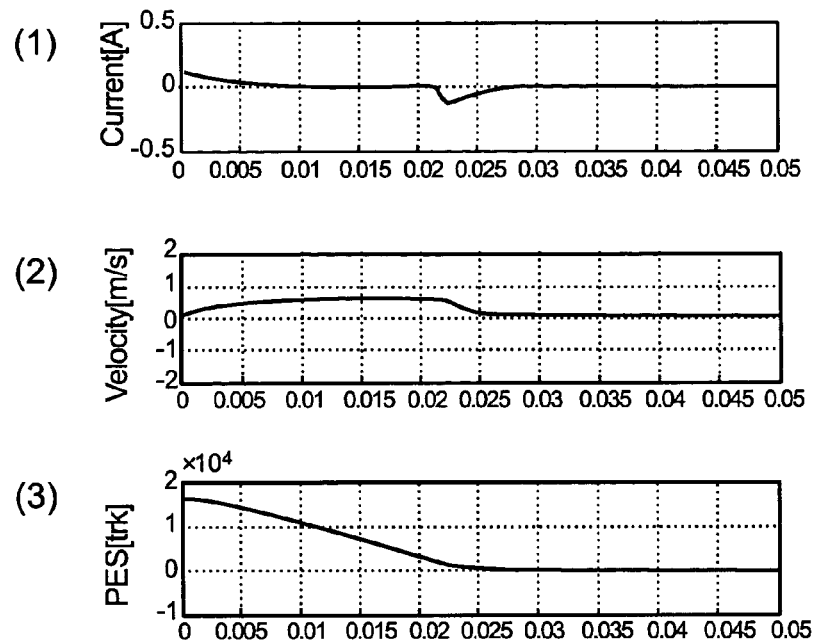
FIG. 3, made up of FIGS. 3(1), 3(2), and 3(3), shows the waveforms of a VCM drive current, a head-speed signal, and a positioning error signal when the voltage feedback amplifier included in the head-positioning control system is operated.

The drive signal provided by the limiter 35 is a limited voltage component as mentioned above, and the speed of the head is controlled through the voltage feedback amplifier 50 according to the voltage component. Operation using the voltage feedback amplifier is selected when the head-position signal is malfunctioning, to restrict the head to a speed corresponding to a voltage within the limit to avoid overshoots, as will be described below with reference to operation using the current feedback amplifier FIGS. 3(1) is the waveform of the VCM drive current when a stepped input signal representing a desired value is given to the disk storage device using the voltage feedback amplifier shown in FIGS. 1 and 2. FIG. 3(2) is the waveform of the speed of the head, and FIG. 3(3) is the waveform of the positioning error signal. As can be seen from FIGS. 3(1), 3(2) and 3(3), the control system using the voltage feedback amplifier is able to positioning the head by controlling the overshooting of the positioning error signal limiting the speed.

The description has been made in which the controller 70 is provided with the PID compensator for reducing the positioning error signal PES to zero. The controller 70 is capable of stably controlling the speed of the head by saturating the drive signal 22 given to the voltage feedback amplifier 50 with $K_f \times V_{max}/Kv$ (V) obtained by dividing the product of multiplication of the predetermined maximum speed $V_{max}$ (m/s) and the VCM counter electromotive voltage constant $K_f$ (V/(m/s) by the gain Kv (V/V) of the voltage feedback amplifier, even if the positioning signal is malfunctioning and the speed signal obtained by differentiating the positioning signal is malfunctioning in calculating a control input on the basis of the speed of the head.

Figure 4:
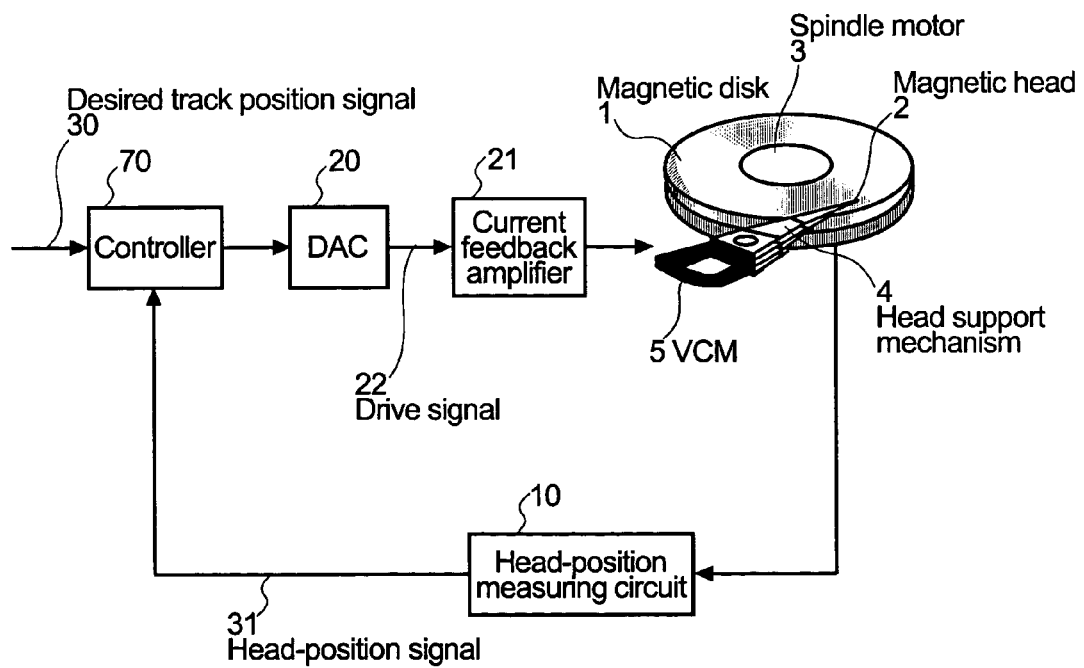
FIG. 4 is a block diagram of a head-positioning control system included in a generally known disk drive and employing a current feedback amplifier.
Figure 5:
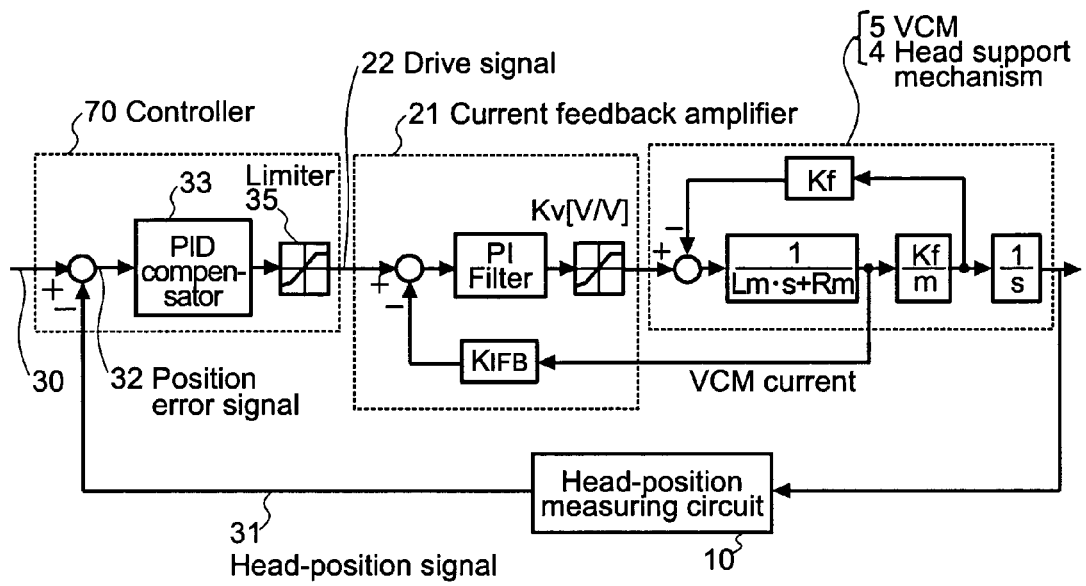
FIG. 5 is a block diagram of a head-positioning control system of a generally known head-positioning control system in a state where a current feedback amplifier is used.

FIGS. 4 and 5 are block diagrams showing additional details of the configuration where current feedback amplifier 21 is selected. FIG. 5 also show additional details of the VCM 5 and the controller 70, as well as additional details of current feedback amplifier 21.

Usually, the PID compensator 33 is used for reducing the positioning error signal 32 to zero. A current supplied to the VCM is fed back to the current feedback amplifier 21, and a PI filter executes a control operation so that a VCM drive current corresponding to the drive signal flows. The current flowing through the VCM is fed back to the current feedback amplifier, i.e., a drive circuit, of the head-positioning control system. The current feedback amplifier has functions to supply a current corresponding to the drive signal 22 and to control the acceleration of the head support mechanism supporting the head.

Figure 6:
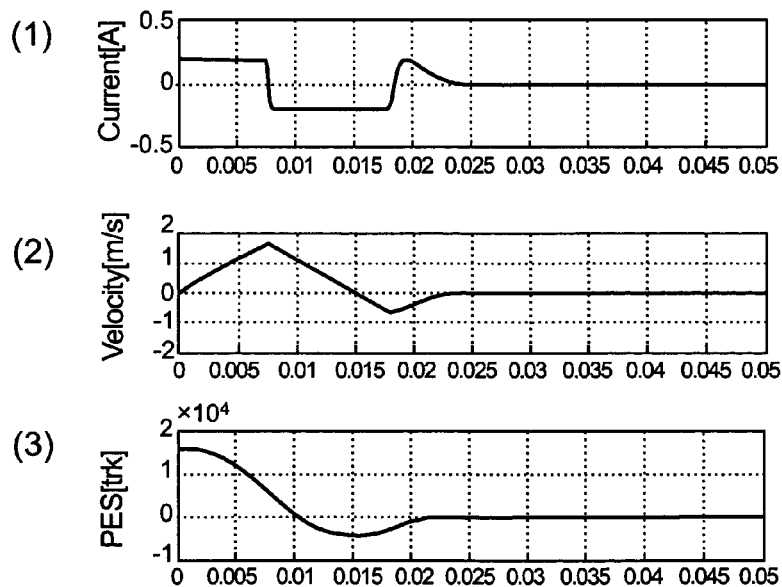
FIG. 6, made up of FIGS. 6(1), 6(2), and 6(3), shows the waveforms of a VCM drive current, a head-speed signal and a positioning error signal when the current feedback amplifier of the head-positioning control system included in the generally known head-positioning control system is operated.

FIG. 6(1) is the waveform of the VCM drive current when a stepped desired value is given to the disk storage device using the current feedback amplifier shown in FIGS. 1, 4, and 5.

FIG. 6(2) is the waveform of the speed of the head, and FIG. 6(3) is the waveform of the positioning error signal. As can be seen from FIGS. 6(1), 6(2), and 6(3), the positioning error signal overshoots greatly in the head-positioning control system employing the current feedback amplifier. When the current feedback amplifier 21 of the drive circuit is used under the normal operating condition, the current feedback amplifier controls the acceleration of the head even if the drive signal is the limited voltage component, so that it is possible that the head overshoots as shown in FIG. 6(3). Therefore, when the head-position signal is malfunctioning, the head must be moved at a speed corresponding to a voltage within the limit by opening the circuit connected to the current feedback amplifier and closing the circuit connected to the voltage feedback amplifier.

Figure 7:
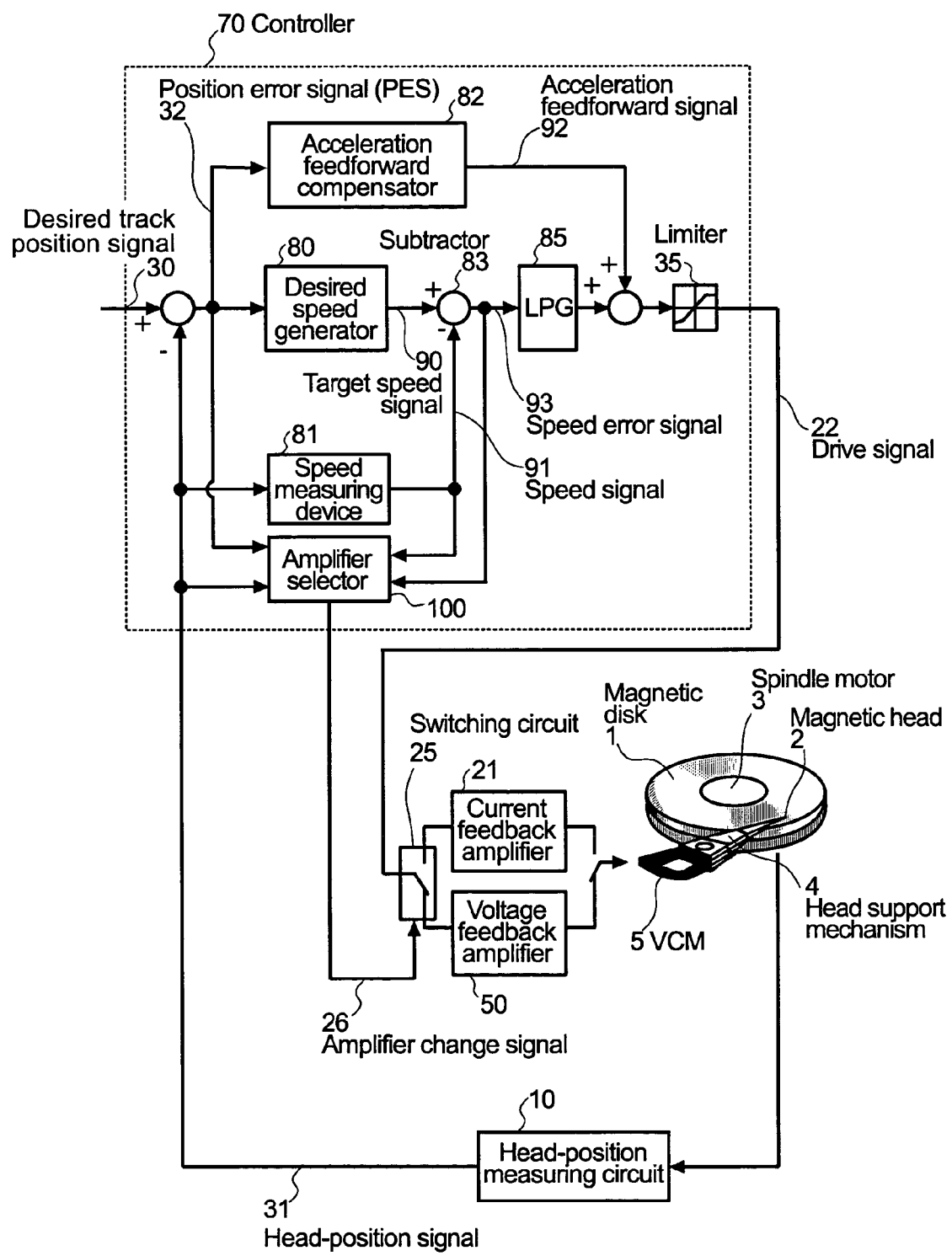
FIG. 7 is a block diagram of an entire head-positioning control system included in a disk storage device in a second embodiment according to the present invention.

FIG. 7 is a block diagram of a head-positioning control system included in a disk storage device in a second embodiment according to the present invention. An amplifier selector 100 included in a controller 70 gives an amplifier change signal 26 to a switching circuit 25. The switching circuit 25 opens a circuit connected to the current feedback amplifier 21 and closes a circuit connected to the voltage feedback amplifier 50 during a rough positioning operation (for example, a state immediately after the connection of the disk storage device to a power supply) or a head-position signal 31 is malfunctioning due to, for example, defects in a magnetic disk 1. Thus, the driving circuit is switched to the voltage feedback amplifier 50 from the current feedback amplifier 21.

To be more specific, for example, a VCM drive circuit including a D/A converter 20, the current feedback amplifier 21 and the voltage feedback amplifier 50, and a spindle motor drive circuit are formed integrally in a single chip. The chip is connected to the controller 70, i.e., a microcomputer, through a serial interface. An analog switch included in the switching circuit 25 is operated by a flag represented by a digital signal provided by the microcomputer. That is, the current feedback amplifier is used if a head-position signal is normal either during a seek operation or a tracking operation (the current feedback amplifier 21 controls the acceleration of the head support mechanism 4 according to the magnitude of a drive signal given thereto). And, the voltage feedback amplifier is used if a head-position signal is malfunctioning in response to power supplying, or due to defects in the magnetic disk or the head, dust or false detection (the voltage feedback amplifier 50 controls the speed of the head support mechanism 4 according to the magnitude of a drive signal given thereto).

The malfunctioning condition of the head-position signal 31 can be detected by a known method disclosed in JP-A 74371/1998. This known method estimates a head-position signal at present from head-position signals sampled in the past, such as track numbers, and detects the malfunctioning condition of the head-position signal from the deviation of the measured head-position signal from the estimated head-position signal. (It is decided that the head-position signal is malfunctioning if a large deviation of an actually measured head-position from the head-position estimated in the past occurs frequently.)

A malfunction head-position signal detecting method and an amplifier selecting method will be described. The controller 70 samples the head-position signal 31 at a sampling period T sec. Suppose that the value of the head-position signal 31 sampled by the present sampling cycle is X(k), the value of the head-position signal 31 sampled by the preceding sampling cycle is X(k−1), and the value of the head-position signal 31 sampled by a sampling cycle two sampling periods before is x(k−2). Then, the speed of the head in the sampling period T is {X(k−1)−X(k−2)}/T. Thus, the value of an estimated head-position signal in the present sampling cycle is expected from the head-position signal sampled in the past by the following equation;

$$Y(k)=X(k-1)+T\times\{X(k-1)-X(k-2)\}/T.$$

The amplifier selector 100 executes calculation using the expression mentioned above, calculates an absolute value |X(k)−Y(k)| of a difference between the value of the head-position signal in the present sampling cycle and the value of the estimated head-position signal in the present sampling cycle. If the absolute value is greater than a predetermined value, the amplifier selector 100 gives an amplifier change signal 26 to the switching circuit 25 to open the circuit connected to the current feedback amplifier 21 and to close a circuit connected to the voltage feedback amplifier 50. Then, the controller 70 executes the seek operation for seeking the desired track again. Upon detection of the normal head-position signal 31, the amplifier selector 100 closes the circuit connected to the current feedback amplifier 21.

Referring again to FIG. 7, the disk drive is provided with a speed measuring device 81 for measuring speed, i.e., a differential signal obtained by differentiating a position signal. A head-moving operation for moving a head a long distance at a high speed is called a seek operation. A seek control system has a subtractor 83 that calculates a speed error signal 93 by subtracting a desired speed signal 90 generated by a desired speed generator 80 from a measured speed signal 91 provided by the speed measuring device 81. The seek control system provides the drive signal 22 obtained by adding an acceleration feedforward signal 92 provided by an acceleration feedforward compensator to a signal obtained by multiplying the speed error signal 93 by a loop gain 85. The acceleration feedforward compensator reduces a follow-up error in the speed signal relative to the desired speed.

While the disk storage device is in the normal operation, an amplifier selector 100 gives a drive signal to the current feedback amplifier 21 for a seek operation. During the seek operation, the amplifier selector 100 monitors the head-position signal 31. If the head-position signal is malfunctioning, the amplifier selector 100 gives an amplifier change signal 26 to a switching circuit 25. Then, the switching circuit 25 opens a circuit connected to the current feedback amplifier 21 and closes a circuit connected to the voltage feedback amplifier 50. A signal given to the voltage feedback amplifier is obtained by saturating the drive signal 22 with a value $K_f \times V_{max}/K_v$ (V) provided by the limiter 35 by dividing the product of multiplication of a desired maximum speed $V_{max}$ (m/s) and a VCM counter electromotive voltage constant $k_f$ (V/(m/s)) by the gain Kv (V/V) of the voltage feedback amplifier 50.

As noted above, the VCM 5 has a speed control loop including a counter electromotive voltage feedback loop obtained by multiplying the speed of a head support mechanism by the counter electromotive voltage constant $K_f$ (V/(m/s)). The speed of the head support mechanism is limited to $V_{max}$ (m/s) by a VCM input voltage saturated with $K_f \times V_{max}$(V). Thus, the speed of the head support mechanism can be limited and the head can be positioned if the head-position signal becomes malfunctioning during the seek operation. Consequently, it is possible to avoid the breakdown of the disk storage device due to a trouble, such as the collision of an actuator supporting the head against a stopper, which occurs in the conventional disk storage device. Although the operation of the amplifier selector 100 when a malfunction condition of the head-position signal is detected has been described, a value that indicates a malfunction condition may be a malfunction value in the positioning error signal, the speed signal or the speed error signal.

As apparent from the foregoing description, the disk storage device embodying the present invention has the following functions. The drive circuit uses selectively either the current feedback amplifier and the voltage feedback amplifier, and the drive signal generated by the controller is given to the drive circuit. There is the possibility that the head support mechanism overshoots, moves outside the moving range and collides against the stopper when the head is moved greatly for the head-positioning operation under an unstable condition immediately after the connection of the disk drive to the power supply. Under such undesirable condition, the drive circuit uses the voltage feedback amplifier instead of the current feedback amplifier, which is employed in the conventional disk drive, to drive the VCM. The drive signal is saturated with the value obtained by dividing the product of multiplication of the desired maximum speed $V_{max}$ (m/s) and the VCM counter electromotive voltage constant $K_f$ (V/(m/s)) by the gain Kv (V/V) of the voltage feedback amplifier to limit the speed of the head to the maximum speed $V_{max}$ to reduce shocks due to collision.

If the head-position signal provided by the head-position measuring circuit 10 becomes malfunctioning, for example, due to defects in the disk during the seek operation, the current feedback amplifier is disconnected from the circuit and the voltage feedback amplifier is connected to the circuit to drive the VCM, and similarly to the above, the drive signal is saturated with the value obtained by dividing the product of multiplication of the desired maximum speed $V_{max}$ (m/s) and the VCM counter electromotive voltage constant $K_f$ (V/(m/s)) by the gain Kv (V/V) of the voltage feedback amplifier to limit the speed of the head to the maximum speed $V_{max}$. Since the speed of the head can be limited to the maximum speed $V_{max}$ (m/s), the disk drive is able to achieve stable head positioning control. The speed of the head can be stably controlled even if the head-position signal indicating the positioning of the head support mechanism becomes malfunctioning and the speed signal obtained by differentiating the head-position signal becomes malfunctioning.

From the foregoing it will be appreciated that in the preferred embodiment of the present invention, the speed of the head can be limited to reduce the overshoot of the head by disconnecting the current feedback amplifier from the circuit and connecting the voltage feedback amplifier to the circuit and saturating the drive signal given to the voltage feedback amplifier.

Moreover, even if the head collides against the stopper due to the extraordinary head-position signal and the unstable head-positioning control operation, the disk drive can be protected from breakdown because the speed of the head at the collision is limited to the predetermined speed.

While the above is a complete description of specific embodiments of the invention, the above description should not be taken as limiting the scope of the invention as defined by the claims.

What is claimed is:

1. A disk storage device comprising:
an information storing disk;
a head for writing data to tracks on said disk and/or reading data from tracks on said disk;
a head-moving mechanism that moves said head in response to an input signal;
a head-position measuring circuit that generates a head-position signal representing a radial position of said head relative to said disk;
a current feedback amplifier;
a voltage feedback amplifier; and
a controller that is configured to:
generate a drive signal using a desired track-position signal and said head-position signal generated by said head-position measuring circuit,
set an upper limit on said drive signal,
monitor said head-position signal, or a signal derived from said head-position signal, to determine whether a malfunction condition exists, and
in the event of determining that a malfunction condition exists, causing said drive signal to be applied as an input to said voltage feedback amplifier and causing an output from said voltage feedback amplifier to provide said input signal to said head-moving mechanism, or
in the event of determining that a malfunction condition does not exist, causing said drive signal to be applied as an input to said current feedback amplifier and causing an output from said current feedback amplifier to provide said input signal to said head-moving mechanism.

2. The disk storage device of claim 1 wherein said signal derived from said head-position signal includes one or more of a positioning error signal, a speed signal or a speed error signal.

3. The disk storage device of claim 1 wherein said malfunction condition is due to defects in said disk or troubles in said head when said head is moved for seeking and tracking.

4. The disk storage device of claim 1 wherein said malfunction condition is an instability of said head-position signal or said signal derived from said head-position signal.

5. A disk storage device comprising:
an information storing disk;
a head for writing data to tracks on said disk and/or reading data from tracks on said disk;
a head support mechanism supporting and moving said head in response to an input signal;
a voice-coil motor for driving said head support mechanism;
a head-position measuring circuit for measuring a radial position of said head relative to said disk;
a controller that calculates a drive signal on the basis of a desired track-position signal and a measured head-position signal measured by said head-position measuring circuit and sends out said drive signal for positioning said head at a position corresponding to a desired track; and
a drive circuit driven by said drive signal for positioning said head at a position corresponding to said desired track by driving said voice-coil motor;
wherein:
said drive circuit includes a current feedback amplifier and a voltage feedback amplifier that are capable of being used selectively,
said controller is provided with a speed limiter for limiting the speed of said head to a predetermined maximum speed, and
said controller is configured to
in the event of determining that a malfunction condition exists, causing said drive signal to be applied as an input to said voltage feedback amplifier and causing an output from said voltage feedback amplifier to provide said input signal to said head support mechanism, or
in the event of determining that a malfunction condition does not exist, causing said drive signal to be applied as an input to said current feedback amplifier and causing an output from said current feedback amplifier to provide said input signal to said head support mechanism.

6. The disk storage device of claim 5 wherein said malfunction condition appears immediately after said disk storage device is connected to a power supply.

7. A disk storage device comprising:
an information storing disk;
a head for writing data to tracks on said disk and/or reading data from tracks on said disk;
a head support mechanism supporting and moving said head in response to an input signal;
a voice-coil motor for driving said head support mechanism;
a head-position measuring circuit for measuring a radial positioning of said head relative to said disk;
a controller that calculates a drive signal on the basis of a desired track-positioning signal and a measured head-position signal measured by said head-positioning measuring circuit and sends out said drive signal to positioning said head at a position corresponding to a desired track; and
a drive circuit driven by said drive signal for positioning said head at a position corresponding to said desired track by driving said voice-coil motor;
wherein:
said drive circuit includes a current feedback amplifier and a voltage feedback amplifier that are capable of being used selectively,
said controller is provided with a speed limiter for limiting the speed of said head to a predetermined maximum speed, and
said controller is configured to
in the event of determining that said head-position signal is a malfunction signal due to defects in said disk or troubles in said head when said head is moved for seeking and tracking, causing said drive signal to be applied as an input to said voltage feedback amplifier and causing an output from said voltage feedback amplifier to provide said input signal to said head support mechanism, or
in the event of determining that said head-position signal is a normal signal, causing said drive signal to be applied as an input to said current feedback amplifier and causing an output from said current feedback amplifier to provide said input signal to said head support mechanism.

8. The disk storage device of claim 5, 6, or 7 wherein said speed limiter is saturated with a value obtained by dividing a product of multiplication of said predetermined maximum speed ($V_{max}$ (m/s)) and a counter electromotive voltage constant ($k_f$(V/(m/s)) of said voice-coil motor by a gain (Kv (V/V)) of said voltage feedback amplifier.

9. The disk storage device of claim 1, 5, 6, or 7 wherein said controller includes:
- a speed determining unit that provides a speed signal indicating said speed of said head by differentiating said head-position signal provided by said head-positioning measuring circuit;
- a desired speed determining unit that generates a desired speed signal on said basis of said head-position signal provided by said head-positioning measuring circuit and said desired track-positioning signal; and
- a subtractor that generates a speed deviation signal by subtracting said output signal of said desired speed determining unit from said output signal of said speed determining unit.

10. The disk storage device of claim 1, 5, 6, or 7 wherein said information storage disk is a magnetic disk.

11. The disk storage device of claim 1, 5, 6, or 7 wherein said head both reads information from said disk and writes information to said disk.

* * * * *